Patented Nov. 23, 1948

2,454,495

UNITED STATES PATENT OFFICE 2,454,495

ALDEHYDE CONDENSATION PRODUCTS OF AMINOTRIAZINES AND THE MANUFACTURE THEREOF

Gustave Widmer and Theodor Sutter, Basel, Willi Fisch, Binningen, and Ernst Hochuli, Basel, Switzerland, assignors, by mesne assignments, to Ciba Products Corporation, Dover, Del.

No Drawing. Application June 12, 1940, Serial No. 340,176. In Switzerland July 1, 1939

16 Claims. (Cl. 260—21)

This invention is concerned with condensation products of aldehydes with aminotriazines and compounds containing at least one alcoholic hydroxy group. It comprises an improved process of manufacture thereof, and the products obtained thereby, as well as their application in the industry.

It has been shown in U. S. Patent 2,197,357 that, by the condensation of aminotriazines with aldehydes and compounds containing alcohol groups, products may be obtained possessing properties which may be varied between wide limits according to the nature and quantities of the different components. For this reason, such products may find the most manifold uses. Thus, on the basis of the invention mentioned, it is possible to manufacture moulding or casting compounds, as well as lacquer bases, adhesives, textile finishing agents, and the like.

The substances containing alcoholic groups—which will simply be referred to as alcohols in the following—obviously unite with the other two components in ether-like unions. By the entry of the alcohols into the molecules of the condensation products the solubility of the resulting compounds, as well as their resistance to water, their capability of being hardened, etc., is influenced extensively. At the same time, a condensation or polymerisation of the resin formed takes place, which may continue until insoluble products are formed.

In the patent mentioned at the outset, reference has already been made to the fact that it is possible among other things to obtain by this process condensation products which give clear solutions in petroleum hydrocarbons. Still, the preparation of lacquers which give clear solutions in petroleum hydrocarbons—which are very desirable products in the lacquer industry—is no simple matter, as, at raised temperatures, ether formation and condensation take place side by side in a manner which is difficult to control. In particular, should high molecular alcohols be used alone or with other components, etherification takes place so slowly that the condensation has already gone too far before a sufficient etherification has been attained.

It has now been proved that these two reactions, which take place concurrently at raised temperatures, can be made to proceed to a high degree separately if work is carried out at temperatures below 50° C. in the presence of sufficient quantities of acid catalysts. In those circumstances the etherification takes place with sufficient speed, whilst the polymerisation only proceeds to a small extent. This is so much the more surprising as it is a known fact that the triazine-aldehyde condensation products, in the presence of acids, are · y easily converted into products which are insoluble in water.

By this method of operation which forms the basis of the present invention, it is possible to maintain a better control over the reaction and to obtain products which possess altered properties by carrying out a sufficient etherification at moderate temperatures first of all, and then, if desired, in a second phase at raised temperature, effecting the polymerisation and also, if desired the replacement of the lower molecular alcohols by the higher alcohols to the extent desired. It is true that, in the patent mentioned above, the temperature of reaction is in no way expressly limited, but the examples are exclusively concerned with condensations taking place on the steam bath or under reflux at the boil.

In contrast to this, a new effect is given by working below 50° C., insofar as in the first phase products of a relatively low degree of polymerisation, but which are already etherified to an extensive degree, are obtained, which, after removal of the acid catalyst, and preferably of the water and, if desired, the low molecular alcohol present, can then be subjected to a further condensation. In the first phase, acids, preferably mineral acids in comparatively considerable quantities, up to 1 mol and more in relation to the triazine, may be used, whereby the reaction may be considerably accelerated.

It is also possible to work in the presence of a diluent consisting of an excess of the alcohol used, or preferably of an indifferent hydrocarbon, whereby after neutralisation the separation of the water present, and of the salts formed, is facilitated. Neutralisation may be carried out with the most diverse agents: in addition to caustic soda, soda, sodium bicarbonate, and caustic lime, calcium carbonate and magnesium oxide have also proved suitable. The neutralisation may also be interrupted at the point where the acid reaction has been reduced as far as to be just sufficient for the performance of the further condensation.

It is possible to start directly from a mixture of an aminotriazine, an aldehyde and one or more alcohols, in which case the aldehyde can also be present in the form of an aqueous solution. Or, it is possible to condense first of all the aldehyde with the alcohol and then only to bring this condensation product into reaction with the triazine. It can also be preferable to cause the aminotriazine to react separately with the aldehyde, under either acid, neutral or alkaline conditions, and then to dehydrate either completely or partially the product obtained which is more or less extensively condensed. The reaction product is then suspended in the alcohol or mixture of different alcohols, if desired with an addition of hydrocarbons, and, after addition of an acid catalyst, the suspension is stirred strongly. Generally a solution is formed in from a few minutes to some hours' time, or, in the presence of larger quantities of water, an emulsion is formed, in which no solid matter—or, at the most, only an unimportant quantity of solid matter—is present. Stirring is continued until a satisfactory degree of etherification is attained, when the acid is exactly neutralised and the reaction product is separated from the salts which are precipitated or from the salt solutions. When the easily saponifiable partial glycerides of the high molecular fatty and resin acids are used, neutralisation is preferably carried out with basic compounds of so weak basicity that neither salt formation with the fatty acids nor saponification takes place; thus, for example, carbonates of the alkaline earths may be used. The acid catalysts may be used in concentrated form or in aqueous solution, but firstly the introduction of too great quantities of water must be avoided, and secondly, in the presence of highly unsaturated fatty acids, an acid concentration must not be used which might cause the addition of the acid radical to the double bonds. The quantity of aldehyde may vary between wide limits: in general, 1–2 mols of aldehyde per every amino group of the triazine yield good results.

The quantities of alcohol to be used may also vary widely. Alcohols of low boiling point may be used in such excess that they serve simultaneously as solvents or as dissolving agents, for example, as much as 10–20 mols or more for every mol of amino triazine may be added to the reaction mixture. In the case of high molecular alcohols which may not be distilled at permissible temperatures, it is preferable that no more than 2–3 mols be used for every mol of aminotriazine. But very good effects may be obtained with appreciably smaller quantities, for example, with a fractional part of a molecule.

The products thus obtained still contain moisture and, if mixtures of alcohols have been used, also an excess of low molecular alcohol, which has partly been used as solvent and dissolving agent. If it be necessary to remove these impurities, the low molecular alcohol may be recovered by distillation, preferably in vacuo. In the cases of methanol and ethanol, provided the reaction is being carried out in an indifferent solvent, insoluble in water, the excess of alcohol may be removed by washing with water. The removal of the water is to be preferred, since in its presence the condensation can be less easily controlled. Removal of the lower alcohol comes chiefly into question where mixtures with higher alcohols have been used, as in the presence of uncombined lower alcohols the ether conversion or the embodying of the higher alcohols into the complex molecule takes place decidedly slower and only to an incomplete extent. In this case, it is obvious that no alcohol will be used as diluent, but hydrocarbons or other indifferent solvents which do not contain hydroxyl groups.

The completely neutralised products are, in general, extraordinarily stable towards heating. As a rule, they are soluble in alcohols or in mixtures of alcohols with toluene, and also in aromatic hydrocarbons. On the other hand, the solubility in petroleum hydrocarbons is still insufficient in many cases. For their own part, they may find use as softeners, for example in nitrocellulose lacquers, as additions to printing colours.

If these condensation products are now heated to higher temperatures with the addition of small quantities of acid catalysts, according to the temperature and time of heating more or less highly polymerised and often more or less reetherified products are obtained, their solubility in petroleum ether for the most part improving with progressing condensation but their compatibility with lower alcohols—even when the latter are used in admixture with aromatic hydrocarbons—being generally less. The resistance towards water of the lacquers also increases, as well as, in most cases, their speed of hardening by baking. The air-drying properties of those products which contain drying fatty acids are also raised, particularly in the presence of metallic driers.

The main advantage of the present invention lies in the fact that these properties can be graded to a much finer and more regular degree than when work is carried out exclusively at raised temperatures. During the further condensation which takes place under mild conditions, the attainment of the desired endstate of the product may be controlled, for example, by frequent viscosity measurements, or by occasional estimation of the quantity of alcohol of 95% strength that may still be absorbed without turbidity by a sample extracted from the reaction mixture.

Whilst the first phase is preferably to be carried out with very considerable, for example, molecular, quantities of mineral acids, it is advantageous if, in the second phase, either minimal quantities of mineral acids, for example, about from $1/1000$ up to $1/10$ mol, or organic acids be used. It is also possible to make use of substances which are capable of forming acid, such as phthalic acid anhydride. If readily volatile acids are used, they distil over with the distillate and leave behind them lacquers which have an unusually low acid number. Non-volatile acids may be eliminated after the treatment by means of neutralisation, but in most cases this is unnecessary.

This further condensation may also take place during the baking process, where lacquers which are hardened by baking are concerned. In this case, small quantities of acid are incorporated without heat treatment in the products of the cold condensation, which have not been further condensed, and which are stable to storage and are, of themselves, very slow in hardening. In such circumstances, an after-condensation rapidly takes place at raised temperatures, and elastic, water-resistant films are obtained, which are scarcely to be distinguished from those obtained by the two-stage process. This method permits use to be made of the great stability towards storing of the lacquers which have not been further condensed, as the addition of the catalyst may be made by the user. Phthalic anhydride, maleic acid, chloracetic acid, etc., have proved particularly satisfactory as catalysts, but it is also possible to make use of inorganic acids, such as sulphuric acid and phosphoric acid. In place of small quantities of acids, larger additions of acid resins, for example, resins of the alkyd type, may be used.

The new lacquers are mainly remarkable for their very light colour, which diminishes almost to colourlessness. Even the completely condensed products are very resistant towards yellowing, even when they are hardened at high temperatures. Furthermore, particularly by using them together with drying fatty acids, very elastic, hard drying, lustrous films may be obtained. It is also possible to obtain products which, in the presence of drying accelerators, dry rapidly in the air, forming very light, water-resistant films.

By alcohols are to be understood both mono-hydric alcohols and poly-hydric alcohols and their derivatives which contain at least one free hydroxyl group.

As monohydric alcohols may be mentioned, for example, the linear and cyclic aliphatic, fatty aromatic, hydroaromatic, and terpene alcohols, such as methyl alcohol, ethyl alcohol, propyl and isopropyl alcohol, butyl alcohol, cyclohexanol, lauryl alcohol, cetyl alcohol, stearyl alcohol, allyl alcohol, benzyl alcohol, terpineol, borneol, abietinol, furfuryl alcohol, wool grease alcohols, etc., as well as those derivatives obtained from polyhydric alcohols by etherification or esterification of a part of their hydroxyl groups. As such, the mono- and di-glycerides of saturated and unsaturated fatty acids, resin acids and aromatic carboxylic acids come chiefly into consideration, as well as mixtures of these glycerides and also partial ethers, such as glycol monoethyl ether and the like. As monohydric alcohols are also to be included those condensation products derived from polyhydric alcohols and polybasic carboxylic acids which still contain a hydroxyl group, as well as their derivatives obtained by modification with monobasic acids.

The term polyhydric alcohols is intended to include all compounds with more than one alcoholic hydroxyl group. Selections from the enormous number of these possible polyhydric alcohols are, for example, ethylene glycol, propylene glycol, di- and tri-ethylene glycol, glycerine, erythritol, arabitol, sorbitol, cyclohexane-diol, inositol. Also included are those polyhydric alcohols which possess other substituents besides the alcohol groups, such as aldehyde, ketonic, carboxylic, halogen, or amino groups, for example, glycerine aldehyde, carbohydrates and their polymers which are still soluble in water, glycerol monochlorhydrin, triethanolamine, etc.

Among the saturated and unsaturated carboxylic acids which may be used in the present process those having at least 8 carbon atoms are preferred. As examples of such acids there are mentioned caprylic acid, caprinic acid, lauric acid, palmitic acid, stearic acid, oleic acid, elaidic acid, erucic acid, stearolic acid, linoleic acid, elaeostearic acid, linolenic acid, natural resin acids, such as abietic acid and pimaric acid or their natural mixtures. Derivatives of the above acids, such as halogenated and hydroxylated acids, for example, ricinoleic acid, may also be used.

Among the aminotriazines which come into consideration, the most important is 2:4:6-triamino-1:3:5-triazine, commonly called melamine. In addition to this, mention may be made, for example, of melam, melem, melon, ammeline, and ammelide, formoguanamine, 2-chloro-4:6-diamino-1:3:5-triazine, 2-(p-hydroxyphenyl)-4:6-diamino-1:3:5-triazine, 2-phenyl-4-amino-6-hydroxy-1:3:5-triazine, 2:4:6-trimethylamino-1:3:5-triazine, 2:5:6-triphenylamino-1:3:5-triazine, as well as their iso derivatives.

As aldehydes, in addition to formaldehyde and its polymers, other aldehydes such as acetaldehyde, benzaldehyde, furfuraldehyde, etc., together with their mixtures with formaldehyde, come into consideration.

If use is made of formaldehyde compounds of aminotriazines, then methylol compounds or mixtures containing methylol compounds may be used as parent substances, or even those condensation products which have already been polymerized to a higher degree by heat treatment.

As hydrocarbons which may be used for the dilution of the reaction mixture, aliphatic, hydroaromatic and aromatic hydrocarbons come into question. Mention may be made, for example, of benzene, toluene, xylene, solvent naphtha, white spirit, dipentene, etc.

In order to obtain light coloured lacquers it is preferable to exclude air from the reaction when working with compounds which are sensitive towards oxygen, and it may also be necessary to work in a current of inert gas.

The reaction may also be carried out with simultaneous or subsequent addition of substances which are capable of reacting with the components or reaction products. The products may also be mixed with natural or artificial resins, oils, softeners, etc.

The new products are particularly remarkable for their solubility in the most varied solvents, particularly for their solubility in the cheap petroleum hydrocarbons. They can be extensively graduated in their solubility and are readily compatible with the most differing artificial resins and softeners. Thus, they may not only be used alone, but also in combination with other lacquer bases, such as nitrocellulose, acetyl cellulose, vinyl lacquers, and alkyd resins, as well as drying oils, the properties of which they are often able to improve considerably. The new products are also suitable for use as impregnating agents and as binding agents for the most varied materials which it may be desirable to unite—for example, for the gluing of wood, of cork waste, of bristles for brushes, of leather waste in the manufacture of artificial leather, of paper and fabrics in the manufacture of laminated objects. Furthermore, the new products may be used in the finishing of textiles of all kinds, for example, in the preparation of finishes, dyeings and prints which are fast to washing. Washable glazed paper and wallpaper may also be manufactured with their assistance, and they are also suitable for the preparation of printing colours.

The products find a particularly cheap and convenient use when they are applied in the form of emulsions in water. Thus, they may be dissolved in organic solvents which are immiscible with water and then, with or without the addition of colour pigments they may be dispersed in water in the form of a very stable emulsion. Protective colloids may also be added where finely divided, insoluble substances which are especially difficult to disperse are employed. These emulsions are particularly suitable for printing purposes, especially for paper and textile printing.

The action of the triazine components in making the resulting products water-resistant is particularly to be observed when they are used in conjunction with materials which are generally known to possess little resistance to water, for example, the partial glycerides of the resin acids. Even when considerable quantities of these resin acids are incorporated into the mixture, very water-resistant and non-yellowing lacquers may be prepared by the present process.

The invention is illustrated and explained by the following examples which, however, in no way restrict its ambit. The quantities given are parts by weight.

Example 1

126 parts of melamine are dissolved in 600 parts of neutral formaldehyde of 30% strength and treated at 90° C. until a sample of the condensation solution gives a resin precipitate on being diluted with twice its quantity of water. 260 parts of water are then removed by vacuum distillation. The condensation solution obtained is stirred, while still warm (60° C.) into a solution containing 800 parts of butanol and 100 parts of concentrated hydrochloric acid, a mixture being thus obtained which has a temperature of about 40° C. After half an hour, 50 parts of soda and 15 parts of common salt are added while stirring, and when these salts are dissolved, the two phases formed are allowed to separate. The butanol layer which is now separated contains still about 0.7 mol of acid per kilo., and, in order to reduce appreciably the water content, about 150 parts are again removed by vacuum distillation. The residue is then subjected to the after condensation by treating it at 90° C. until a sample, which has been neutralised and filtered, gives a resin precipitate on addition of three times its quantity of alcohol of 95% strength. When this point is reached, the reaction solution is completely neutralised with soda, and a further approximately 250 parts of water and butanol are removed by again distilling in a vacuum. The residue is now filtered, preferably with an addition of a filtering assistant such as diatomaceous earth, and the filtrate is concentrated to a syrup containing about 90% of substance. The resin thus obtained is very easily soluble in petroleum hydrocarbons and in most other solvents. In conjunction with, for example, nitrocellulose lacquers or alkyd lacquers, it yields valuable lacquer films which are exceptionally water-resistant. If the after condensation described above be omitted, similar lacquer films may be prepared, but they are very much less resistant to water.

If, instead of 600 parts of formaldehyde, only 300 parts be used and work be then carried out as described above, resin solutions are obtained which dry in a warm atmosphere without becoming sticky and which harden rapidly.

Example 2

168 parts of trimethylmelamine are dissolved in 170 parts of ethyl alcohol. A mixture containing 225 parts of alcoholic formaldehyde of 40% strength and 30 parts of concentrated hydrochloric acid and which consists for the most part of methylenediethyl ether is run in, and the reaction mixture is allowed to stand for 1½ hours, after which time it is neutralised with soda. A resin solution is obtained which yields a resin precipitate on being diluted with water and which gives a hard firm on being coated on to a substrate and drying and hardening.

Example 3

126 parts of melamine are dissolved in 600 parts of neutral formaldehyde of 30% strength, and the mixture is condensed until a sample of the condensation solution gives a resin precipitate on being allowed to cool. The solution is then dried either in a vacuum or by means of a roller dryer, and the product thus obtained is ground up.

300 parts of the dry product are shaken for 16 hours at room temperature with 800 parts of methyl alcohol and 100 parts of formic acid. A clear solution is obtained which may be used as a lacquer or as an intermediate product for further condensations.

Example 4

126 parts of melamine (1 mol) are dissolved in 600 parts of hot, weakly alkaline formaldehyde solution of 30% strength (6 mols) and the solution is treated for 10 minutes at 90° C. and then cooled. After some time, separation of solid matter takes place, and the whole reaction mixture solidifies to a white mass, which is broken up and dried and then ground.

324 parts of the product obtained, which essentially consists of hexamethylolmelamine, are stirred in the cold into a solution consisting of 800 parts of isopropanol and 100 parts of concentrated hydrochloric acid. After about ½ hour, a solution has formed which is neutralised with caustic soda after 20 hours, two layers being formed. The alcoholic layer is distilled in a vacuum, and the residue is taken up in benzene and filtered. When the benzene solution is evaporated, 440 parts of a clear, viscous resin are obtained. The resin is soluble in alcohols, benzene, etc., but not in water, and finds particular application in the lacquer field.

Example 5

100 parts of linseed oil monoglyceride are dissolved in 140 parts of ethanol and 100 parts of toluene, and 64 parts of hexamethylolmelamine (obtained as described in Example 4, paragraph 1) are suspended in this solution. 20 parts of concentrated hydrochloric acid are then added in one portion, stirring briskly. In about 1 hour a clear solution is obtained. Stirring is continued slowly for a further 16 hours at room temperature and the reaction solution is then neutralised by addition of 20 parts of powdered chalk while stirring for several hours. After dilution with 100 parts of toluene, the reaction mixture is filtered and the filtrate is washed twice with 200 parts of water in the separating funnel, after which the toluene layer is evaporated in vacuo until it amounts to about 330 parts. 3 parts of phthalic anhydride are now added and the mixture is stirred in a current of nitrogen for 3 hours at an inside temperature of 105° C. After cooling, the solution is filtered and the filtrate is evaporated in a vacuum until it contains about 90% of dry matter. A viscous, light-coloured lacquer is obtained, which hardens rapidly at 150° C. to give a light-coloured, lustrous, hard film, which is resistant towards boiling water and which is remarkable for its high elasticity and tenacity. After addition of the quantity of cobalt and lead driers usual for oil lacquers it exhibits very good air-drying properties.

Example 6

A mixture of 6 parts of wood oil and 20 parts of linseed oil is converted in known manner into the monoglyceride and is added to 20 parts of a mixed linseed oil-colophony glyceride. 70 parts of ethanol and 50 parts of benzene are now run in, 32 parts of hexamethylolmelamine, prepared as described in Example 4, paragraph 1, are suspended in the solution and, with strong stirring, 10 parts of sulphuric acid of 50% strength are added. After a short time, solution takes place. Stirring is continued for a further 14 hours at room temperature, and the reaction mixture is then neutralised by stirring for some hours with powdered chalk. After the calcium sulphate formed has been removed by filtering, the water which has separated out is run off from a separating funnel and the solution left is evaporated in vacuo until all the water and ethyl alcohol have been distilled. The remaining solution is standardised with toluene to a solid content of 50% and, after adding 2 parts of phthalic anhydride, the mixture is heated for 5 hours at 100–105° C., and it is then cooled, filtered and the toluene is distilled away in a vacuum. A light-coloured, viscous lacquer is obtained which may be diluted with white spirit to any desired extent and which, on heating at 150° C., yields very hard, pale yellow, lustrous films of very good resistance to water. After addition of a cobalt drier, it possesses very good air-drying properties.

The mixed linseed oil-colophony glyceride is prepared by heating 150 parts of colophony WW with 150 parts of boiled linseed oil and 105 parts of glycerine with the addition of 0.5 part of caustic soda in a stirring vessel in a stream of nitrogen for 1 hour at 270–280° C. The acid number of the melt amounts to 2.0. Any excess of glycerine may be removed by washing with water.

Example 7

38 parts of the colophony-linseed oil glyceride used in Example 6 are dissolved in 60 parts of butanol and 50 parts of toluene. In this solution, 29 parts of the hydrophobic melamine-formaldehyde condensation product, described in Example 3, paragraph 1, are suspended and, with brisk stirring, 8.5 parts of concentrated hydrochloric acid are run in. After 2 hours, a clear solution is obtained. It is stirred for a further 14 hours at room temperature and then almost neutralised very carefully with caustic soda solution of 10% strength, after which it is stirred for a further hour with a little bicarbonate of soda. When the aqueous layer has been separated in the separating funnel, the residue is evaporated to a solid content of about 90%. The viscous residue is soluble in white spirit, and its films harden rapidly at 150° C. forming elastic, water-resistant, light-coloured coatings.

Example 8

3600 parts of the mixed glyceride of wood oil and linseed oil referred to in Example 6 are dissolved in 5000 parts of ethyl alcohol of 95% strength. 2300 parts of hexamethylolmelamine are introduced and then 1060 parts of a dilute sulphuric acid, prepared by adding 360 parts of concentrated sulphuric acid to 700 parts of ice, are added in 2 or 3 portions. After 2–3 hours an emulsion has formed which contains no solid constituents.

This emulsion is now heated to 40° C. and is stirred for a further 5 hours at this temperature, after which it is neutralised with 600 parts of powdered chalk whilst stirring for several hours, filtered, and the water which has separated is removed by means of a separating funnel. The toluene layer is evaporated in vacuo to a weight of 6500 parts. A light-coloured, slightly viscous solution is obtained which still contains 18% of toluene.

This product shows very great stability when heated, its films harden very slowly in the baking oven and it requires a very long time to dry in the air, even in the presence of known metallic driers. It is readily compatible with drying and non-drying oils, nitrocellulose lacquers and most softeners. It may be used as a softener and as an addition to printing colours.

Example 9

120 parts of the product obtained in Example 8 are diluted with 60 parts of white spirit and 30 parts of toluene, and this solution is heated with 5 parts of glacial acetic acid for 5 hours at 95° C. After it has cooled down, the solution is filtered and distilled. The acetic acid distils with the toluene and a portion of the white spirit, and a viscous solution of a new product remains which contains about 20% of white spirit. After addition of the usual driers, this product has a very appreciable speed of drying in the air, but it is still very insensitive against the action of heat. It may be diluted as desired with white spirit and is particularly suitable for use as an addition to printing colours.

Example 10

120 parts of the product described in Example 8 are diluted with 60 parts of white spirit and 30 parts of toluene and, after addition of 5 parts of formic acid, are heated for 3 hours at 95° C. After removal of the formic acid and toluene by distillation in vacuo, a very viscous solution remains behind which hardens very rapidly at 150° C. and which, after addition of the usual driers, possesses very good air-drying properties. Its acid number is only 4.7.

Example 11

2300 parts of the product described in Example 8 are diluted with 850 parts of white spirit and 600 parts of toluene and 30 parts of phthalic anhydride are added. The mixture is stirred for 2 hours at 95° C. with exclusion of air, after which it is filtered and the filtrate is evaporated in vacuo to a solid content of about 60%. The product is moderately viscous, light-coloured, clear, and possesses a very good speed of hardening and of air-drying. If a higher viscosity be desired, this may be obtained with ease by a carefully controlled heating of the product at 80–90° C. whilst stirring strongly. The product has an acid number of 8–10.

The product obtained may be used as follows for the printing of textile material:

115 parts of a lacquer prepared from 60 parts of the product described above and 55 parts of white spirit are mixed with 11.5 parts of Ciba Scarlet G (Colour Index No. 1228). This mixture is ground as fine as possible in a porcelain colour mill. 126.5 parts of a lacquer colour are obtained which are emulsified with the same quantity of water in a high-speed emulsifying apparatus, and the emulsion is then prepared for printing by addition of 12–15 parts of white spirit. The printing of the material is carried out by the intaglio printing process. The prints are dried for a short time at about 60° C. and are hardened for about 8 seconds at 150° C. or for a correspondingly longer time at a lower temperature, for example, at about 100° C. The drying may be accelerated by the addition of 0.5–1% of a cobalt drier to the printing paste. Prints which are fast to washing and rubbing and which have a soft handle are obtained. The emulsions may also be used for the printing of wallpaper.

In place of the pigment dyestuff named above, other pigments, such as insoluble azoic dyestuffs, phthalocyanines which are metal-free or which contain metal, iron oxide, ultramarine blue, chrome yellow, etc., may be used.

Example 12

360 parts of concentrated sulphuric acid are introduced, with good cooling, into 5040 parts of ethyl alcohol of 95% strength. 3600 parts of a mixture of wood oil and linseed oil monoglyceride, as was described in Example 6, are also dissolved in 5000 parts of toluene and then 2300 parts of hexamethylolmelamine are introduced. Whilst stirring briskly, the two mixtures are added together, and stirring is continued for 16 hours at room temperature, after which the reaction mixture is neutralised by stirring for several hours with an addition of 500 parts of powdered chalk, the temperature being raised towards the end of the neutralisation to 40–50° C. After filtration and removal of the water which separates, the toluene layer is evaporated as far as possible in a vacuum, after which it is diluted with 2500 parts of white spirit and 3200 parts of toluene and then stirred with 50 parts of phthalic anhydride for 3 hours at 95° C. The filtered solution is now evaporated in vacuo to a solid content of 70%. This solution may be diluted as desired with white spirit, hardens very rapidly in the baking oven and has very good air-drying powers. Its films are hard, lustrous and very water-resistant. When kneaded in a quantity of 10% with cork chippings, it yields, after pressing at raised temperature, very water-resistant, elastic, odourless artificial cork masses.

*Example 13*

120 parts of coconut oil fatty acids are heated with 120 parts of colophony 5A, 90 parts of glycerine and 1 part of aluminium powder for about ½ hour at 295° C. The mixed glyceride obtained, which has an acid number of 1–2, is dissolved in a mixture of 400 parts of spirit and 400 parts of benzene, 180 parts of hexamethylolmelamine are introduced and 60 parts of sulphuric acid of 50% strength are added at normal temperature with brisk stirring. After stirring has been continued for 14–16 hours, 50–60 parts of powdered chalk are introduced in several portions, and stirring is continued until neutralisation is complete. The calcium sulphate formed is then filtered off, the aqueous layer removed and the benzene solution of resin is freed from benzene by distillation, the last portion of the solvent being preferably removed in vacuo at 90–100° C. A viscous, very light-coloured resin is obtained, having an acid number of 2, which may be kept heated at 60° C. for weeks without hardening taking place. If it be desired to use it as a baking lacquer, the product must be correspondingly diluted and 2–6% of phthalic anhydride must be dissolved in the solution. The films then harden even at 120° C., but more rapidly at 150° C., giving very light-coloured, hard and elastic films. Aromatic or petroleum hydrocarbons, even in mixtures with alcohols and ketones, may be used as solvents.

*Example 14*

320 parts of a practically neutral glyceride (prepared analogously to Example 6, last paragraph, from equal parts of castor oil and hydrogenated colophony together with the required quantity of glycerine) of which the hydroxyl content lies between that of a mono- and a diglyceride, are dissolved in a mixture of 450 parts of benzene and 450 parts of ethyl alcohol: 200 parts of hexamethylolmelamine are introduced and 70 parts of sulphuric acid of about 50% strength are slowly added. The reaction mixture is worked up as has been described in Example 13. A very light-coloured, thick oil is obtained, which has excellent storage properties. Coats prepared with a suitably diluted mixture of this resin with 20% of an acid alkyd resin (acid number about 30) harden at 150° C. in a very short time to yield very lustrous, colourless, hard and flexible films.

What we claim is:

1. As new articles of manufacture the substantially neutralized polymeric condensation products obtained by condensing aldehydes with aminotriazines, and with compounds containing at least one alcoholic hydroxy group, at temperatures below 50° C., in presence of a proportion of an acid catalyst amounting to from about ⅓ to about 2 mols per mol of aminotriazine, said products being characterized by a high degree of etherification, by a comparatively low degree of condensation, by high solubility, and by a high stability to storing.

2. As new articles of manufacture the substantially neutralized polymeric condensation products obtained by condensing aldehydes with aminotriazines, and with an alcohol containing 1 to 5 carbon atoms and a compound containing at least one alcoholic hydroxy group and more than 5 carbon atoms, at temperatures below 50° C., in presence of a proportion of an acid catalyst amounting to from about ⅓ to about 2 mols per mol of aminotriazine, said products being characterized by a high degree of etherification, by a comparatively low degree of condensation, by high solubility, and by a high stability to storing.

3. As new articles of manufacture the substantially neutralized polymeric condensation products obtained by condensing formaldehyde with melamine and with compounds containing at least one alcoholic hydroxy group, at temperatures below 50° C., in presence of a proportion of an acid catalyst amounting to from about ⅓ to about 2 mols per mol of aminotriazine, said products being characterized by a high degree of etherification, by a comparatively low degree of condensation, by high solubility, and by a high stability to storing.

4. As new articles of manufacture the substantially neutralized polymeric condensation products obtained by condensing formaldehyde with melamine and with an alcohol containing 1 to 5 carbon atoms and a compound containing at least one alcoholic hydroxy group and more than 5 carbon atoms, at temperatures below 50° C., in presence of a proportion of an acid catalyst amounting to from about ⅓ to about 2 mols per mol of aminotriazine, said products being characterized by a high degree of etherification, by a comparatively low degree of condensation, by high solubility, and by a high stability to storing.

5. As new articles of manufacture, mixtures of the substantially neutralized polymeric condensation products of claim 1 with small quantities of an acid catalyst.

6. As new articles of manufacture, mixtures of the substantially neutralized polymeric condensation products of claim 1 with substantial quantities of an alkyd resin.

7. As new articles of manufacture, mixtures of the substantially neutralized polymeric condensation products of claim 2 with small quantities of an acid catalyst.

8. As new articles of manufacture, mixtures of the substantially neutralized polymeric condensation products of claim 3 with small quantities of an acid catalyst.

9. A process for the manufacture of highly etherified resinous products of comparatively low condensation stage which comprises condensing an aldehyde with an aminotriazine and a compound containing at least one alcoholic hydroxy group at a temperature below 50° C. in presence of a proportion of an acid catalyst amounting to from about ⅓ to about 2 mols per mol of aminotriazine, whereby predominantly etherification results, the resultant highly etherified product being readily polymerizable at elevated temperature in the presence of from about 1/1000 to about 1/10 mol of acid catalyst, and then subjecting the resultant product after substantial elimination of the acid to an aftertreatment at a temperature above 90° C. in presence of a small quantity of an acid catalyst.

10. A process for the manufacture of highly etherified resinous products of comparatively low condensation stage which comprises condensing an aldehyde with an aminotriazine and an alcohol containing 1 to 5 carbon atoms and a compound containing at least one alcoholic hydroxy group and more than 5 carbon atoms at a temperature below 50° C. in presence of a proportion of an acid catalyst amounting to from about ⅓ to about 2 mols per mol of aminotriazine, whereby predominantly etherification results, the resultant highly etherified product being readily polymerizable at elevated temperature in the presence of from about 1/1000 to about 1/10 mol of acid catalyst, and then subjecting the resultant product after substantial elimination of the acid to an aftertreatment at a temperature above 90° C. in presence of a small quantity of an acid catalyst.

11. A process for the manufacture of highly etherified resinous products of comparatively low condensation stage which comprises condensing an aldehyde with an aminotriazine and an alcohol containing 1 to 5 carbon atoms and a monoglyceride of a carboxylic acid containing at least 8 carbon atoms and selected from the class consisting of saturated and unsaturated fatty acids and resin acids at a temperature below 50° C. in presence of a proportion of an acid catalyst amounting to from about ⅓ to about 2 mols per mol of aminotriazine, whereby predominantly etherification results, the resultant highly etherified product being readily polymerizable at elevated temperature in the presence of from about 1/1000 to about 1/10 mol of acid catalyst, and then subjecting the resultant product after substantial elimination of the acid to an aftertreatment at a temperature above 90° C. in presence of a small quantity of an acid catalyst.

12. A process for the manufacture of highly etherified resinous products of comparatively low condensation stage which comprises condensing an aldehyde with an aminotriazine and an alcohol containing 1 to 5 carbon atoms and a mixed glyceride of a carboxylic acid containing at least 8 carbon atoms and selected from the class consisting of saturated and unsaturated fatty acids and resin acids at a temperature below 50° C. in presence of a proportion of an acid catalyst amounting to from about ⅓ to about 2 mols per mol of aminotriazine, whereby predominantly etherification results, the resultant highly etherified product being readily polymerizable at elevated temperature in the presence of from about 1/1000 to about 1/10 mol of acid catalyst, and then subjecting the resultant product after substantial elimination of the acid to an aftertreatment at a temperature above 90° C. in presence of a small quantity of an acid catalyst.

13. A process for the manufacture of highly etherified resinous products of comparatively low condensation stage which comprises condensing formaldehyde with melamine and a compound containing at least one hydroxy group at a temperature below 50° C. in presence of a proportion of an acid catalyst amounting to from about ⅓ to about 2 mols per mol of aminotriazine, whereby predominantly etherification results, the resultant highly etherified product being readily polymerizable at elevated temperature in the presence of from about 1/1000 to about 1/10 mol of acid catalyst, and then subjecting the resultant product after substantial elimination of the acid to an aftertreatment at a temperature above 90° C. in presence of a small quantity of an acid catalyst.

14. A process for the manufacture of highly etherified resinous products of comparatively low condensation stage which comprises condensing an aldehyde with an aminotriazine and a compound containing at least one alcoholic hydroxy group at a temperature below 50° C. in presence of a proportion of a mineral acid catalyst amounting to from about ⅓ to about 2 mols per mol of aminotriazine, whereby predominantly etherification results, the resultant highly etherified product being readily polymerizable at elevated temperature in the presence of from about 1/1000 to about 1/10 mol of acid catalyst, and then subjecting the resultant product after substantial elimination of the acid to an aftertreatment at a temperature above 90° C. in presence of a small quantity of an acid catalyst.

15. A process for the manufacture of highly etherified polymeric condensation products which comprises condensing an aldehyde with an aminotriazine and a compound containing at least one alcoholic hydroxy group at a temperature below 50° C. in presence of a proportion of an acid catalyst amounting to from about ⅓ to about 2 mols per mol of aminotriazine, whereby predominantly etherification results, and then subjecting the said resultant product after substantial elimination of the acid to an aftertreatment at a temperature about 90° C. in presence of a small quantity of an acid catalyst.

16. A process for the manufacture of highly etherified polymeric condensation products which comprises condensing an aldehyde with an aminotriazine and a compound containing at least one alcoholic hydroxy group at a temperature below 50° C. in presence of a proportion of an acid catalyst amounting to from about ⅓ to about 2 mols per mol of aminotriazine, whereby predominantly etherification results, and then subjecting the said resultant product after a substantial elimination of the acid to an aftertreatment at a temperature about 90° C. in presence of a substantial quantity of an alkyd resin.

GUSTAVE WIDMER.
THEODOR SUTTER.
WILLI FISCH.
ERNST HOCHULI.

REFERENCES CITED

The following references are of record in the file of this patent:

UNITED STATES PATENTS

| Number | Name | Date |
| --- | --- | --- |
| 2,197,357 | Widmer et al. | Apr. 16, 1940 |
| 2,197,442 | Widmer et al. | Apr. 16, 1940 |
| 2,209,292 | Berger | July 23, 1940 |
| 2,219,375 | Widmer et al. | Oct. 29, 1940 |
| 2,223,327 | Light et al. | Nov. 26, 1940 |